United States Patent
Katano et al.

(10) Patent No.: US 8,456,619 B2
(45) Date of Patent: Jun. 4, 2013

(54) IMAGE PROCESSING APPARATUS AND METHOD

(75) Inventors: Yasuo Katano, Kawasaki (JP); Takayuki Iwamoto, Kawasaki (JP); Hiroyuki Ohsawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 12/796,185

(22) Filed: Jun. 8, 2010

(65) Prior Publication Data
US 2010/0322481 A1 Dec. 23, 2010

(30) Foreign Application Priority Data
Jun. 19, 2009 (JP) .................................. 2009-147005

(51) Int. Cl.
*G01C 3/08* (2006.01)
(52) U.S. Cl.
USPC ........................................................ 356/4.01
(58) Field of Classification Search
None
See application file for complete search history.

(56) References Cited

U.S. PATENT DOCUMENTS
2002/0149762 A1* 10/2002 Ditto ............................ 356/5.09

FOREIGN PATENT DOCUMENTS
JP 2963990 10/1999

OTHER PUBLICATIONS

T. DeWitt and D. Lyon, "Range-finding method using diffraction gratings," 1995, Applied Optics, 34, 2510-2521.*
Wikipedia: the free encyclopedia, "Cross-correlation", Wikimedia Foundation, Inc., Apr. 7, 2009.*
Wikipedia: the free encyclopedia, "Charged-coupled devices", Wikimedia Foundation, Inc., Jun. 1, 2009.*
Light Field Photography with a Hand-Held Plenoptic Camera, Ren Ng; Marc Levoy; Mathieu Bredif; Gene Duval; Mark Horowitz; Pat Hanrahan; Stanford University; Duval Design, SIGGRAPH Feb. 2005, pp. 1-11, (Cited in the spec. [0005]).

* cited by examiner

*Primary Examiner* — Stephen R Koziol
*Assistant Examiner* — Raphael Schwartz
(74) *Attorney, Agent, or Firm* — Cowan, Leibowitz & Latman, P.C.

(57) ABSTRACT

Subject-distance information is acquired by a light-weight, small-size arrangement without a significant change in the structure of a conventional image processing apparatus. The apparatus acquires diffraction images obtained by sensing the image of a subject, using an image sensing unit, obtained via a diffraction grating and imaging optical system, detects a real image from luminance gradients of the diffraction images, calculates the distance between the detected real image and a virtual image corresponding to this real image in the diffraction images, and calculates the depth distance between the subject and the diffraction grating using the distance calculated by first calculating unit.

5 Claims, 6 Drawing Sheets

IMAGE PROCESSING APPARATUS AND METHOD

BACKGROUND OF THE INVENTION

1. Field of the Invention

The present invention relates to measurement of distance from a subject having an image feature, which has been extracted via image recognition, to an image sensing device.

2. Description of the Related Art

Many methods have been proposed heretofore with regard to measuring the distance from a subject to an image sensing device. Examples of such measurement methods according to the prior art will be described. One such method, which is used in autofocus cameras and the like, involves forming an image on an element such as a distance-measuring element using a two-eye lens or the like in the optical system. Further, with a depth-from-focus method, the focus is moved constantly and the distance that prevails when the video is sharpest on the observation screen is found as the estimated distance. With the depth-from-defocus method, on the other hand, the extent of image defocus is analyzed and the estimated distance is found based on the relationship between the amount of defocus and distance.

A ray-tracing method using a microlens array or the like illustrated in Non-Patent Document 1 finds estimated distance by analyzing angle information of captured light rays.

In the field of image recognition in particular, a technique using multiple cameras also in the distance measurement methods set forth above is often employed as a method of acquiring three-dimensional depth information. According to such a method, a luminance gradient feature such as a salient point or edge is acquired using an image feature, namely an affine invariant, such as a Harris affine or SIFT. By making the acquired luminance gradient feature, such as the salient point or edge, information that is independent of point-of-view position, the correspondence with the image features at the multiple cameras is acquired and the distance between the image sensing device and the subject of image capture is found by the principle of triangulation.

[Patent Document 1] Japanese Patent No. 2963990

[Non-Patent Document 1] Light Field Photography with a Hand-held Plenoptic Camera/Ren Ng, Marc Levoy, Mathieu Bredif, Gene Duval, Mark Horowitz, Pat Hanrahan/Stanford University, Duval Design/SIGGRAPH 2005

However, these methods have a number of problems, described below.

First, the problem with distance measurement using multiple cameras is an increase in cost that accompanies an increase in the number of image sensing devices. With regard to the large number of products sold, such as surveillance cameras and handycams, requiring multiple cameras to be installed is a major disadvantage for such sales.

Further, using special-purpose hardware results in equipment of a larger size. In the case of multiple cameras, base length is directly linked to measurement accuracy and therefore a certain amount of base length is required. Such an increase in the size of the equipment is itself a disadvantage.

Another problem is an increase in weight that accompanies an increase in size. In order to implement this method, at least two cameras are required. Consequently, in a case where it is desired to hold down cost per unit, as in surveillance and security, or at installation locations where a reduction in weight is a challenge, such as at the end of a robot arm, or in handycams and digital cameras, an increase in weight due to multiple units is a major problem.

Accordingly, a small-size, light-weight, inexpensive three-dimensional depth-measuring method using monocular vision has been studied. However, the conventional method that relies upon monocular vision involves the problems set forth below.

First, the phase-difference method used in autofocus cameras and the like requires a distance-measuring element and a distance-measuring optical system, etc., in addition to a CMOS for image capture. Further, with the phase-difference method, distance measurement can only be performed at several points to tens of points on the observed image. As a consequence, it is difficult to obtain a distance image.

A lens focal-point method requires movement of focus and is accompanied by mechanical drive of a focusing lens. Acquiring a distance image, therefore, takes time. Further, a defocus analysis method uses the relationship between blur, which is produced by a telecentric optical system, and image formation. This means that there is little degree of freedom in terms of lens design. A ray-tracing method using a microlens array or the like is such that a decline in the spatial resolution of an in-focus image occurs to the extent that angle information of the captured light is acquired. Although a distance image and an in-focus image are obtained by a method using a patterned diaphragm or the like described in Patent Document 1, this method uses a telecentric optical system and is implemented by a diaphragm using a pin-hole aperture. Consequently, a problem is a decline in amount of light.

SUMMARY OF THE INVENTION

The present invention has been devised in view of the above-mentioned problems and provides a light-weight, small-size image processing apparatus that is capable of acquiring subject-distance information without significantly changing the structure of a conventional image processing apparatus.

Accordingly, an image processing apparatus according to the present invention comprises: acquisition unit for acquiring diffraction images obtained by sensing the image of a subject, using an image sensing unit, obtained via a diffraction grating and an imaging optical system; real-image detecting unit for detecting a real image from luminance gradients of the diffraction image; first calculating unit for calculating distance, in the diffraction images, between the detected real image and a virtual image corresponding to the real image; and second calculating unit for calculating depth distance between the subject and the diffraction grating using the distance calculated by the first calculating unit.

By virtue of the image processing apparatus according to the present invention, subject-distance information can be acquired by a light-weight, small-size arrangement without a significant change in the structure of a conventional image processing apparatus.

Further features of the present invention will become apparent from the following description of exemplary embodiments with reference to the attached drawings.

DESCRIPTION OF THE EMBODIMENTS

<First Embodiment>

Figure 1:
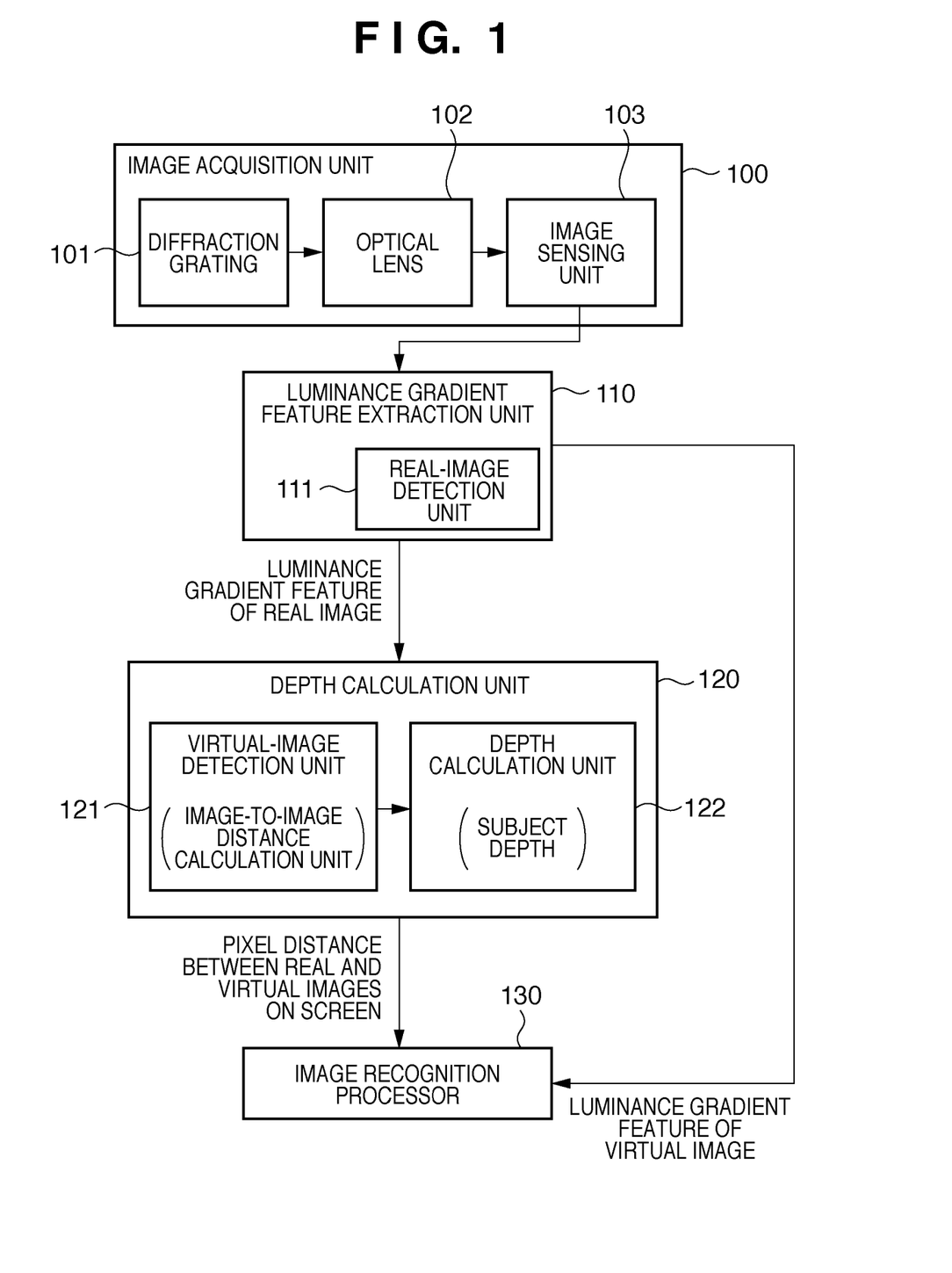
FIG. 1 is a diagram illustrating a system configuration according to first to fourth embodiments of the present invention.

Depth measurement of an image feature using a diffraction grating will be described. FIG. 1 illustrates the configuration of a representative image processing apparatus.

In the case described below, this embodiment presumes a digital camera, digital video or a web camera for surveillance and augments the ordinarily used camera unit with a diffraction-grating filter. The embodiment calculates the depth distance of an ROI (Region of Interest) from an optical relationship between the real image of a subject and a diffraction image obtained from a diffraction grating whose grating constant d is known, and applies this information to image recognition.

An image acquisition unit 100 would be an ordinary video camera unit having an optical lens 102 and an image sensing unit 103 if it were not provided with a diffraction grating 101. In this embodiment, however, the arrangement is such that the diffraction grating 101 is placed in front of the optical lens 102 and therefore an image containing a diffraction image can be obtained through an imaging system different from the ordinary. Images including the real image and the virtual image captured by the image sensing unit 103 are sent to a luminance gradient feature extraction unit 110, where a real-image detection unit 111 detects the real image from these images. The luminance gradient feature of the detected real image is sent to a depth calculation unit 120, in which a virtual-image detection unit 121 detects an image having a high correlation with the detected real image using window processing, described later, and detects this image as the virtual image. The virtual-image detection unit 121 includes first calculation unit for finding the distance between the detected real and virtual images. Further, a depth calculation unit 122 includes second calculation unit for calculating the distance between the subject and the image sensing device (image acquisition unit) using the distance found by the first calculation unit. An image recognition processor 130 applies this to recognition of the acquired image using the luminance gradient feature of the real image and the pixel-to-pixel distance between the real and virtual images.

Figure 2:
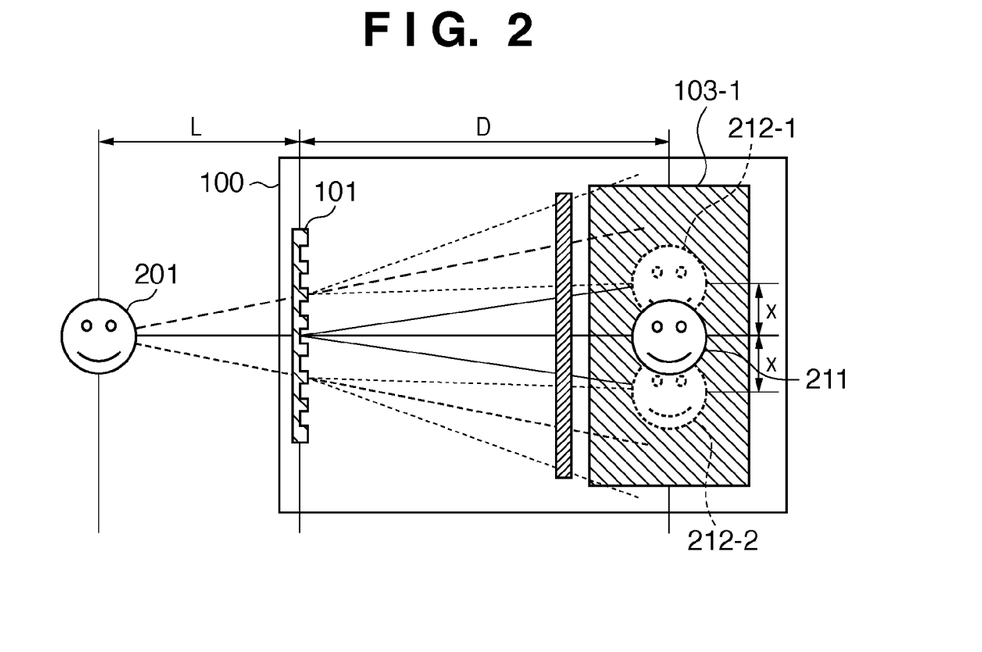
FIG. 2 is a diagram schematically illustrating an image acquired by an imaging system according to the first to fourth embodiments.

FIG. 2 illustrates the internal structure of the image acquisition unit 100 and the concept of distance calculation in this embodiment. In order to simplify the description and calculation formulae, the optical lens 102 is omitted from FIG. 2 and D taken as the distance between the diffraction grating and image sensing element taking the optical system of the lens into consideration. In actuality, in a case where the optical lens is taken into account, the process up to the imaging of the subject on the image sensing element is a complicated one. In order to comprehend the basic concept, however, the case described below devoid of the optical lens will be sufficient. Further, with an ordinary video camera, a primary-color or complementary-color RGB filter 104 is placed in front of the image sensing element to achieve RGB separation. In order to simplify the description, however, processing in case of the color green (G) will be discussed here. Processing for the colors red (R) and blue (B) is similar and need not be described.

The image sensing unit 103 uses a CMOS sensor in this example. It goes without saying that the image sensing element is not limited to a CMOS and that any element capable of recording optical information, such as a CCD or silver-salt element, will suffice. Consider a case where a white subject 201 is imaged by the apparatus of the first embodiment. Optical information originating from the white subject 201 impinging upon the image acquisition unit 100 is spectrally diffracted and then projected upon the CMOS image sensing unit 103 through the imaging optical system, optical lens 102 and RGB filter 104 placed in back of the diffraction grating. The image indicated at 211 in FIG. 2 is the real image of the subject 201 formed on the image sensing unit 103 on the optic axis. Images indicated at 212-1 and 212-2 are virtual images which are ascribable to the diffraction grating 101 and reflect the distance between the subject 201 and the diffraction grating 101. The virtual images 212-1 and 212-2 appear at positions symmetrical with respect to the real image 211.

Figure 3:
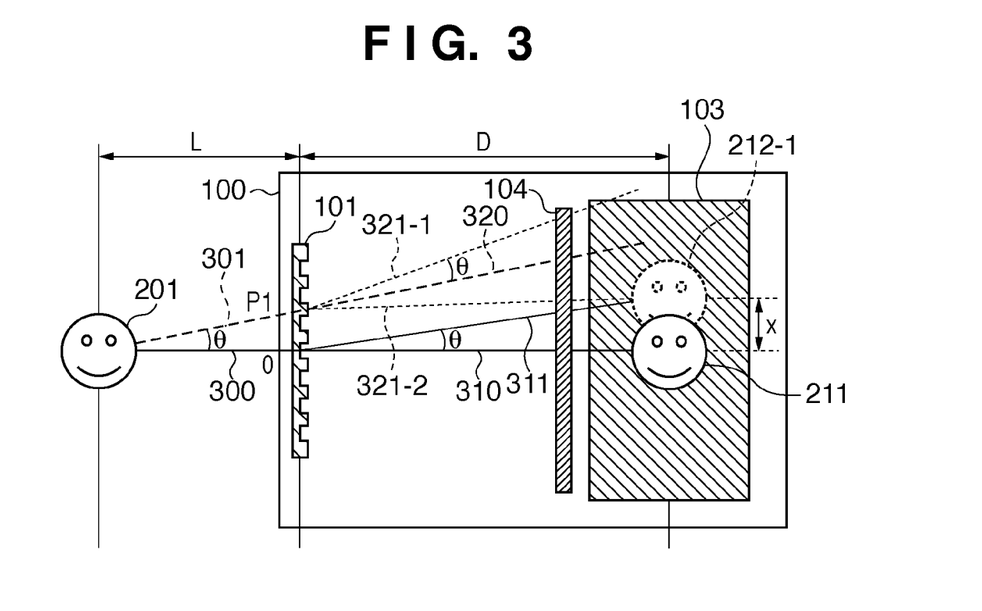
FIG. 3 is a schematic view for calculating distance between a diffraction grating and a subject according to the first to fourth embodiments.

Reference will be had to FIG. 3 to describe a method of calculating distance L between the diffraction grating 101 and subject 201 from distance x between the real image 211 and each virtual image 212 on the image sensing unit 103. In order to simplify the description, the calculation will be described with regard to the virtual image 212-1. Since the calculation is similar also for the virtual image 212-2, the description regarding this virtual image will be omitted.

When the subject 201 is illuminated by the illuminating light (white light), the illuminating light is scattered at the surface of the object 201 and light rays 300, which travel along the optic axis, impinge upon a point O on the diffraction grating 101. Further, scattered light rays 301, which scatter in a direction forming an angle θ with respect to the light rays 300 impinge upon a point P1 on the diffraction grating 101. The light rays 300 that have passed through the diffraction grating 101 become zero-order diffraction light 310 and first-order diffraction light 311 owing to the diffraction effect. The angle θ formed by the zero-order diffraction light 310 and first-order diffraction light 311 at this time is represented by the following equation, in which d is the grating constant of the diffraction grating 101:

$$d \sin \theta = \lambda \quad (1)$$

Here, with regard to wavelength λ, the angle θ is found using the peak value of the sensitivity curve of RGB filter 104. Since the peak value differs depending upon the video camera, it is measured in advance. In this embodiment, λ=550 nm is assumed as an example of the sensitivity of the green region.

Next, the scattered light rays 301 impinge upon the point P1 of the diffraction grating 101 and, owing to the diffraction effect, become zero-order diffraction light 320 and, at an angle θ with respect thereto, first-order diffraction light 321-1 and 321-2. Only the green component of the scattered light rays 301 is extracted by the RGB filter 104. This light component is projected upon the image sensing unit 103. Owing to the diffraction effect, the first-order diffraction light 311 of the light rays 300 along the optic axis and the first-order diffraction light 321-1 of the scattered light rays 301 strengthen each other, and the virtual image 212-1 appears at a position located at a distance x from the real image 211.

From the relationship mentioned above, the difference OP1 between the positions at which the light rays 300 and scattered light rays 301 impinge upon the diffraction grating 101 is represented by OP1=x. Therefore, if the distance x between the real and virtual images ascribable to the diffraction grating 101 is used, then, from the optical relationship, the distance L between the diffraction grating 101 and subject 201 is found from the following equation, where $\sin \theta$ is represented by Equation (1):

$$L = x\sqrt{\frac{1 - \sin\theta}{\sin\theta}} \quad (2)$$

Alternatively, if the grating constant d and wavelength $\lambda$ are used, we have the following:

$$L = x\sqrt{\frac{d - \lambda}{\lambda}} \quad (3)$$

According to these equations, it is possible to calculate the distance L to the subject 201 from the distance x between the real image 211 and virtual image 212-1.

Here the distance L has been calculated using the principle of the diffraction grating as the method of distance calculation. In actuality, however, there are many cases where an accurate value of $\lambda$ cannot be calculated because accurate values of the grating constant, the distance D of the optical system based upon the optical lens 102 and the peak value of the sensitivity curve of the RGB filter 104 are unknown. Accordingly, a calibration may be performed by actually placing the subject 201 at a position (referred to as "l" below) where L is already known and finding the position X at which the virtual image 212-1 appears at this time, and the distance L to the subject 201 may be calculated using Equation (4) below.

$$L:x=l:X \quad (4)$$

In this embodiment, the RGB filter 104 is described as being the green filter of a primary-color filter in order to simplify the description. However, this does not impose any limitation. It goes without saying that it is possible to calculate the distance L by a similar method even with regard to red and blue of a primary-color filter, magenta and cyan of a complementary-color filter, or with regard to an RGB filter having a different frequency characteristic, such as in the infrared band.

Figure 4:
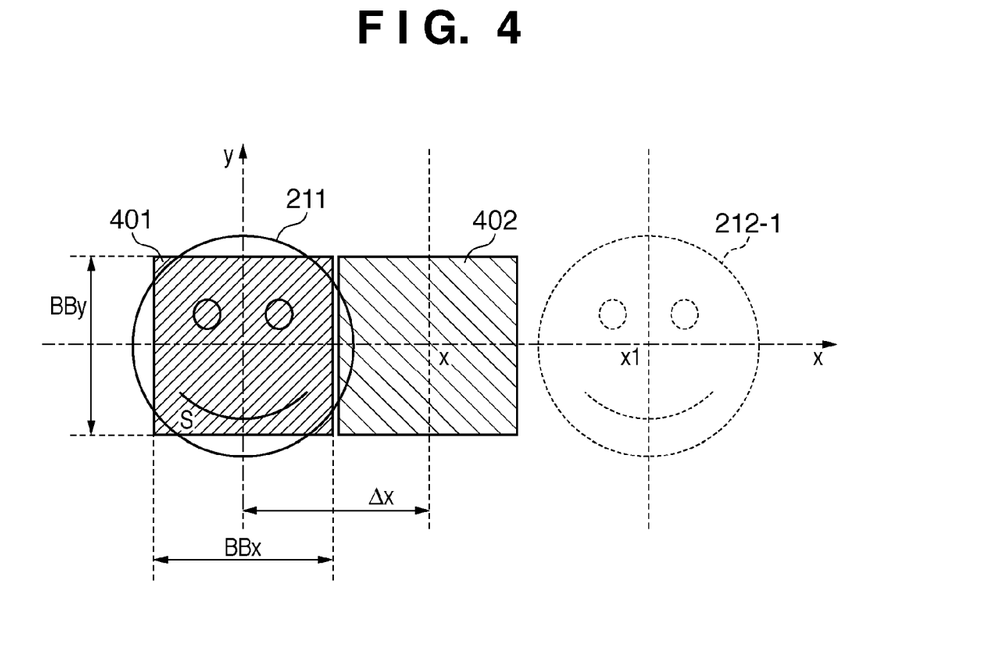
FIG. 4 is a schematic view of a method of calculating distance between a real image and a virtual image by moving a window.

FIG. 4 is a conceptual view for calculating distance x1 between the real and virtual images. Let the center of the real image 211 be the origin, let the direction toward the virtual image 212-1, namely the direction perpendicular to the diffraction grating, be the positive x-axis direction, and let the direction upward from the real image 211 be the positive y-axis direction. The virtual-image detection unit 121 of the image processing apparatus sets a first window 401 the center of which is the center of the extracted real image. Let the size of this window be BBx, BBy. The virtual-image detection unit 121 sets a second window as well. Specifically, let a window obtained by moving the first window 401 along the x axis by a scanning distance $\Delta x$ be a second window 402. The dimensions BBx and BBy are dependent upon the calculation capability of the processing system and the size of the subject.

Since the dimensions BBx and BBy have no direct bearing upon the object of the present invention, these need not be described.

The virtual-image detection unit 121 of the image processing apparatus further computes the correlation between the luminance distribution within the first window 401 for the real image and the luminance distribution within the second window 402. Let an expected value be represented by E, let the luminance value of a pixel at a position within the extracted window be a first luminance value $X_0$, and let the average of luminance of pixels within the first window 401 be a first luminance average value $X_{0ave}$. Further, let a pixel luminance value within the second window 402 corresponding to the first luminance value within the first window 401 be a second luminance value $L_{\Delta x}$, let the average of luminance of pixels within the second window 402 be a second luminance average value $X_{\Delta xave}$, and let a variance relating to this luminance distribution be represented by $\sigma^2$. If these variables are used, an autocorrelation function involving the first window 401 and second window 402 will be as expressed by Equation (5) below.

$$R(\Delta x) = \frac{E[(X_0 - X_{0ave})(X_{\Delta x} - X_{\Delta xave})]}{\sigma^2} \quad (5)$$

Since the autocorrelation value is maximized when the second window 402 is moved to the position x1 of the virtual image 212-1, it is possible to calculate the virtual-image position x1.

It should be noted that the distance between the real and virtual images is calculated by this method using an autocorrelation function. However, this does not impose any limitation. It goes without saying that this distance can be calculated in similar fashion by another method using an autocorrelation function. According to this method, calculation time can be shortened because it will suffice to perform scanning in a direction perpendicular to the slit of the diffraction grating 101.

Figure 5:
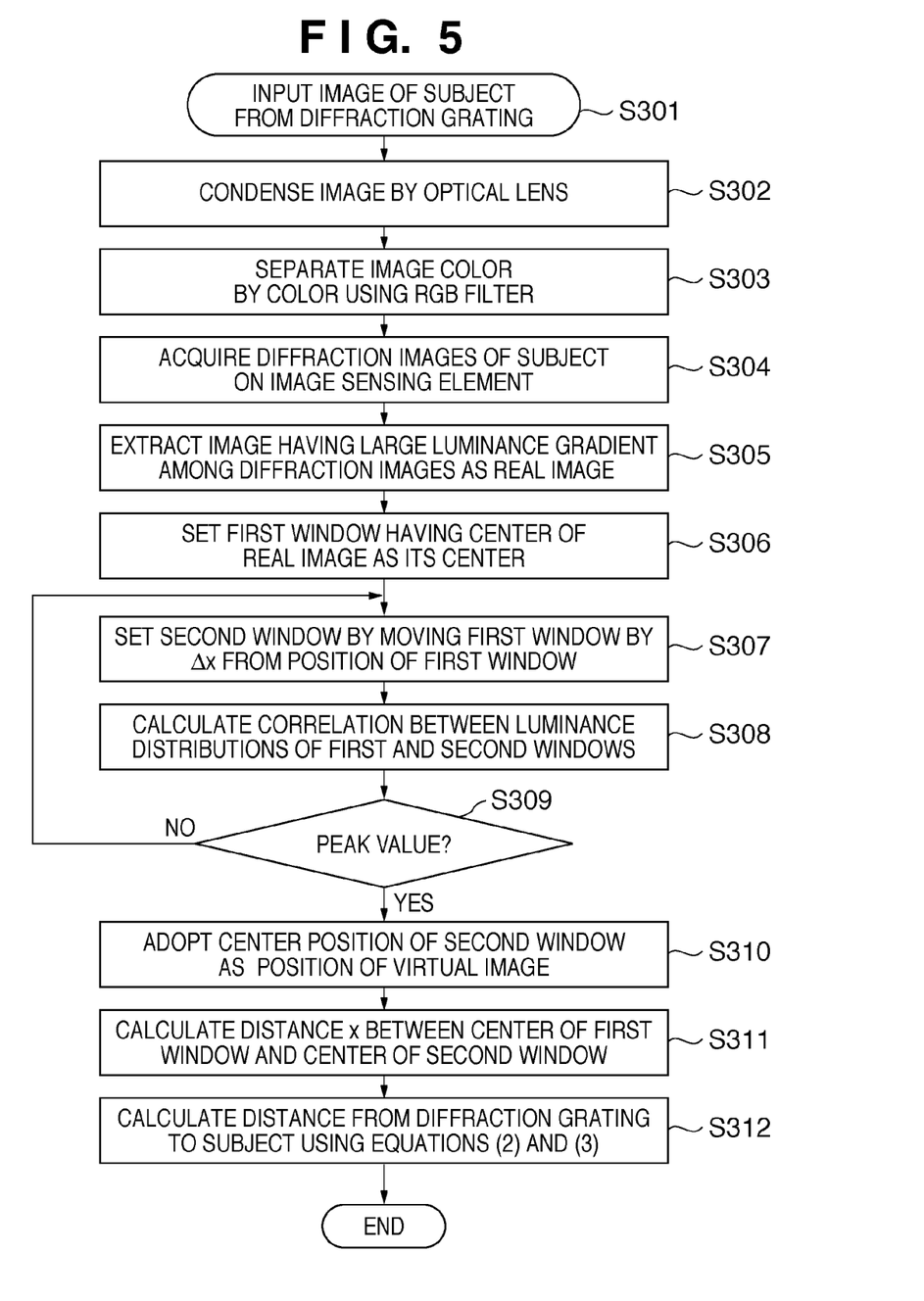
FIG. 5 is a flowchart illustrating calculation of distance between real and virtual images in the first embodiment.

The operation set forth above will now be described with reference to the flowchart of FIG. 5.

Steps S301 to S303 indicate operation within the image acquisition unit 100. Steps S304 to S312 indicate image processing executed by the luminance gradient feature extraction unit 110 and depth calculation unit 120, etc., of FIG. 1. This processing may be executed using a personal computer, by way of example.

The diffraction grating 101 diffracts the image of the subject at step S301, and the optical lens 102 condenses the diffraction images at step S302. The images are separated in accordance with the R, G, B wavelengths at step S303 by the RGB filter 104. In this example, the diffraction images corresponding to the color green (G) are illustrated in FIGS. 2 and 3.

At step S304, the image sensing unit 103 of image acquisition unit 100 acquires images of the subject, inclusive of the virtual and real images, diffracted by the diffraction grating 101 and separated into R, G, B (only G in this example) by the RGB filter. At step S305, the real-image detection unit 111 of luminance gradient feature extraction unit 110 extracts, as the real image, the image having the largest luminance gradient among the acquired images, by way of example. A method of extracting the real image will be described in third and fourth embodiments.

At step S306, the virtual-image detection unit 121 sets the first window 401 the center of which is the center of the extracted real image 211 (or the center of gravity of luminance). At step S307, the virtual-image detection unit 121 sets the second window 402 obtained by moving the first window 401 by Δx in the direction perpendicular to the slit of the diffraction grating.

At step S308, the virtual-image detection unit 121 calculates the correlation between the luminance distribution in the first window and the luminance distribution in the second window. At step S309, the virtual-image detection unit 121 increments by Δx, plots the calculated correlation value in relation to x and checks to determine whether the correlation value indicates the peak value. If the value is not the peak value, control returns to step S307 and the second window is moved by Δx. If the value is the peak value, then control proceeds to step S310. Another peak detection method that may be adopted is to move the second window by more than the range of distance over which the peak first appears, thereby evaluating the overall correlation value within this range, and then decide the peak value.

At step S310, the virtual-image detection unit 121 adopts the position of the center of the second window at this time as the position of the virtual image. At step S311, the virtual-image detection unit 121 calculates the distance between the center position of the first window and the center position of the second window. At step S312, the depth calculation unit 122 calculates the depth distance using the calculated distance and Equations (2), (3).

Thus, as described above, the first embodiment acquires the diffraction images of a subject, detects real and virtual images from the diffraction images and finds the distance between the real and virtual images, thereby making it possible to calculate the distance between the subject and the diffraction grating.

<Second Embodiment>

A method of specifying a virtual image utilizing the symmetry of two virtual images will be described. The description will be rendered using FIGS. 1 to 4 in a manner similar to that of the first embodiment.

In the first embodiment, the distance is found between the real image 211 and the virtual image 212-1 projected upon the image sensing unit 103. Here we will describe how to deal with a case where the correlation function does not take on a large value, as in a case where the background is very noisy or the contrast of the real image 211 is low.

As illustrated in FIG. 2, the virtual images of the real image 211 appear as the virtual image 212-1 and virtual image 212-2 in line symmetry with the direction perpendicular to the slit of the diffraction grating. The distance between the real image and each of the virtual images is equal to x. Here, making use of the fact that distance x1 (see FIG. 4) between the real image and the virtual image 212-1 calculated in the first embodiment and distance x2 (not shown) between the real image and the virtual image 212-2, which exists along the negative x-axis direction, are equal, the peak positions of the correlation function for which x1=x2 holds are defined as the positions of the virtual images. This is performed utilizing the above-mentioned symmetry. Then, in a case where these two peak positions are detected to be in symmetry with respect to the real image 211, the distance between the real image and each of the virtual images is calculated using these virtual images. If the two peak positions are not symmetrical, then the calculation of distance is not performed using these virtual images. In this way virtual-image position can be found without error and calculated. Further, this prevents calculation of an erroneous virtual-image position owing to degradation of correlation coefficients due to noise.

In this embodiment, an image region is set as a window. However, this does not impose any limitation. It goes without saying that similar effects are obtained even with one-dimensional information along the x-axis direction or y-axis direction.

In general, when a diffraction grating is used, a plurality of virtual images are obtained. Since a primary slit is used in this embodiment, two virtual images appear. By using perpendicular slits, however, it is possible to project four virtual images on the image sensing element, namely virtual images above and below as well as on the left and right. This makes virtual-image identification of higher definition possible.

<Third Embodiment>

Next, a method of specifying a virtual image utilizing a difference to the virtual image that differs depending upon an RGB wavelength difference will be described. This will be described using FIGS. 1 to 4 as in the first embodiment.

With regard to a virtual image that appears on the image sensing element, the image sensing device has a virtual-image detection unit for checking the likelihood that the image is a virtual image and deciding whether the image is a suitable virtual image. In this embodiment, virtual images are found utilizing the fact that distances between real and virtual images projected onto the image sensing unit 103 differ depending upon difference in wavelength, namely the fact that the wavelength λ differs depending upon the RGB filter 104.

This embodiment deals with a case where an RGB primary-color filter is adopted in an image sensing device for acquiring a color image in a video camera, digital camera or the like. The embodiment limits the color frequency region using the primary-color filter placed in front of the ordinary image sensing unit 103 and limits the color information that is input to the photoreceptor element.

Figure 6:
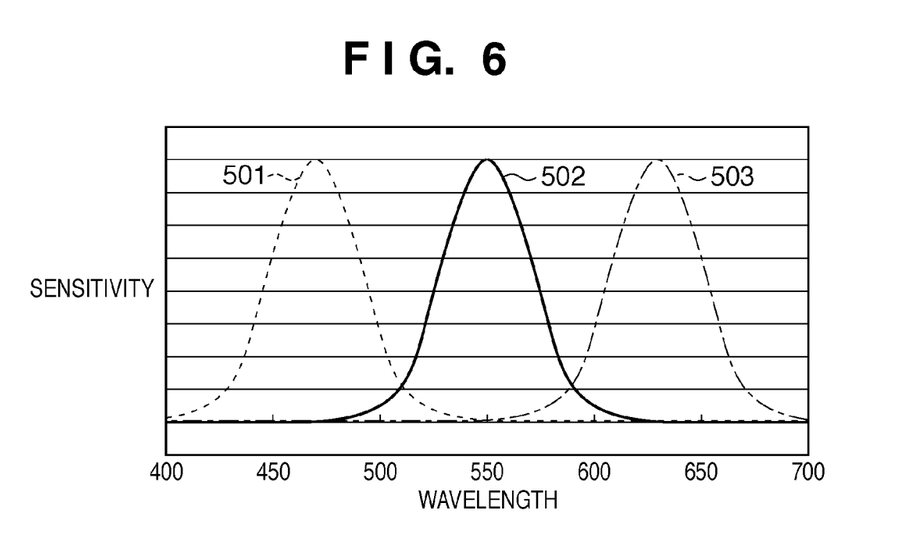
FIG. 6 is a diagram illustrating sensitivity characteristic of a typical primary-color filter.

FIG. 6 illustrates the sensitivity characteristic of a typical primary-color filter as well as the result of calculating the correlation coefficients of the respective colors R, G, B. Since the primary-color filter has been extracted selectively for every wavelength, positions x1r, x1g, x1b of the virtual image 212-1 and positions x2r, x2g, x2b of the virtual image 212-2, which are to found for R, G, B, respectively, are calculated at different positions. The ratios among R, G, B are calculated utilizing this characteristic.

FIG. 6 illustrates an example of the optical sensitivity characteristic of the typical primary-color RGB filter 104. Curve 501 is the sensitivity curve of the primary-color filter in the blue region and has a peak at wavelength lb=470 nm. Similarly, assume that curve 502 is the sensitivity curve of the primary-color filter in the green region and has a peak at wavelength λg=550 nm, and that curve 503 is the sensitivity curve of the primary-color filter in the red region and has a peak at wavelength λr=630 nm.

At this time the positions of the virtual images of the subject 201 located one meter ahead appear on the image sensing element in accordance with the wavelength λ of each of R, G, B, and the positions of the virtual images differ from one another. Use is made of the fact that the distance ratios are equal for the RGB components of the virtual image 212-1 and RGB components of the virtual image 212-2, and of the fact that a prescribed change appears in relation to the virtual-image positions in accordance with each of the wavelengths of R, G, B. That is, in order to discriminate between noise and a true virtual image, a determination is made with regard to whether these virtual images are equidistant from the real image 211 and have distance ratios corresponding to R, G, B. If the result of the determination is acceptable, then these virtual images are utilized to calculate the distances between the real image and these virtual images. If the result of the determination is not acceptable, then these virtual images are not utilized.

Figure 7:
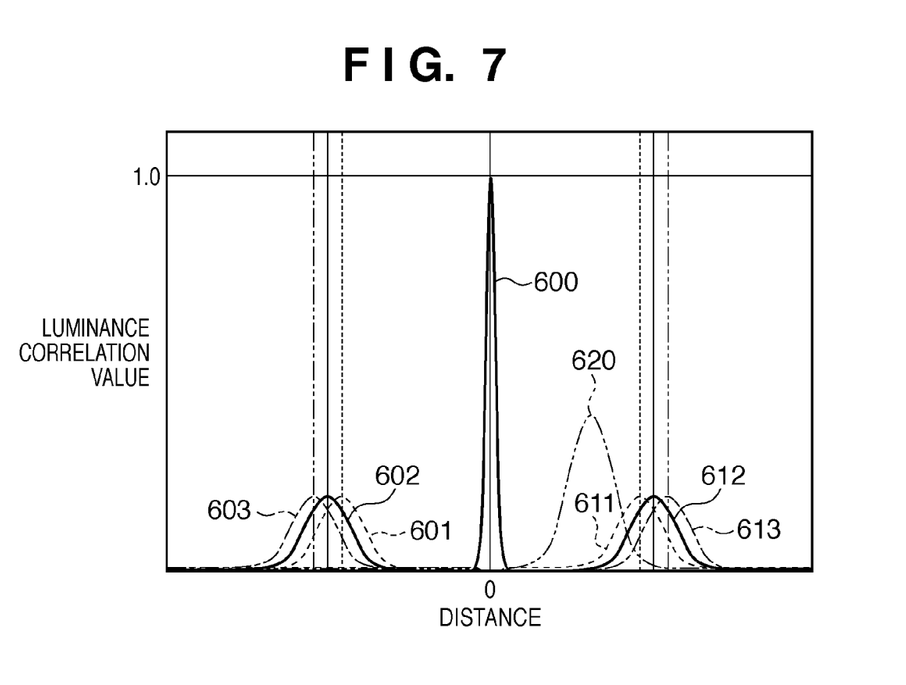
FIG. 7 is a diagram illustrating correlation of luminance values between a real image and virtual images.

Further, this image sensing device has the real-image detection unit 111 and extracts a real image utilizing a correlation of luminance values. FIG. 7 illustrates correlation of luminance values between the real image 211 and virtual images 212-1, 212-2. A peak 600 is the correlation value of a pixel in the real image 211 and has a value of 1.0 since this is correlation of the image with itself. The correlation values of the virtual images 212-1, 212-2 are smaller than 1.0 because the luminance information is partitioned into R, G, B. Further, the intensity declines because the luminance values are distributed over the range of the color filter. Peaks 601 and 611 indicate the positions of virtual images ascribable to the image only of the color blue (B) among R, G, B. The distances between the peak 600 and the peaks 601, 611 are equal. Similarly, the peak values ascribable to the image only of the color green (G) are at 602, 612, and the peak values ascribable to the image only of the color red (R) are at 603, 613.

In such luminance distributions, even if there is a peak 620 which is a peak due to noise, the fact that the peak 620 is not a peak due to a virtual image can be understood because a distribution corresponding to the peak 620 does not exist as a pair and, moreover, because the RGB distributions are not uniform. In this case, therefore, the peak 620 ascribable to noise is not utilized as a virtual image.

In this embodiment, placement of a color filter is assumed. However, this does not impose any limitation. It goes without saying that even in a case where the photoreceptor element itself possesses frequency selectivity, such a photoreceptor element is applicable.

<Fourth Embodiment>

A fourth embodiment will be described with regard to a method of extracting only a real image utilizing a characteristic in a case where a diffraction grating has been combined with an image sensing device.

When detection of a luminance gradient feature as typified by a SIFT feature or Harris feature is carried out in image recognition processing, the depth information is an important key. In particular, depth distance information is an important key in processing such as segmentation processing for determining that a feature in the neighborhood indicates a portion of the same subject.

A method for acquiring depth distance of an image feature in the fourth embodiment will be described. A large change in contrast can be mentioned as a property of a luminance gradient feature. The contrast of the real image 211 is represented as a graph of the peak 600 in FIG. 7 and when the luminance gradient feature is calculated, it is extracted as a feature. However, since the luminance gradient feature of a virtual image becomes smooth, as indicated by the graphs of 601 to 613, it is possible to exercise control in such a manner that the luminance gradient feature of a virtual image will not be extracted.

Figure 8:
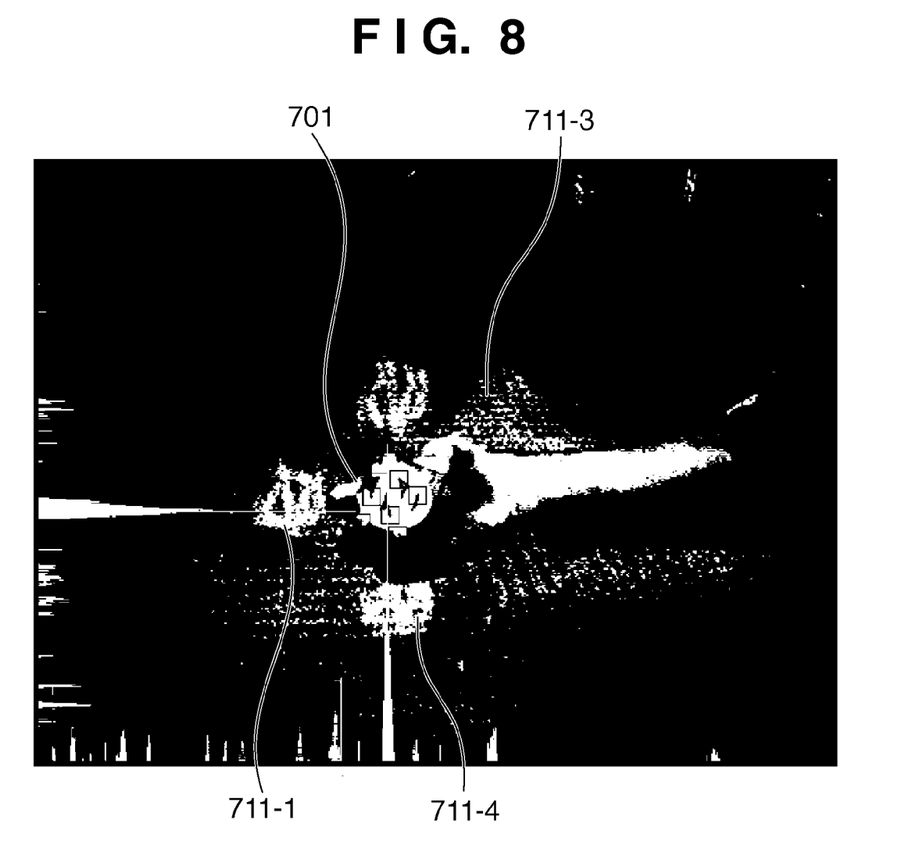
FIG. 8 is a diagram illustrating an example of an image captured in the fourth embodiment.

FIG. 8 illustrates an example of the fourth embodiment. The real image 211 is represented at 701 in FIG. 8, and virtual images 711 exist in the vicinity of the real image. Since perpendicular slits are used in the diffraction grating, the virtual images appear above and below and on the left and right. The rectangles in the real image 701 represent features at corner points ascribable to a Harris feature. It will be understood that although a luminance gradient feature is detected from the real image 701, luminance gradient features are not detected as corners in the virtual images 711.

It will be understood that by utilizing this characteristic, the depth distance of the luminance gradient feature that exists in the real image 701 can be calculated by extracting only the image feature of the real image 701 from the images and calculating the positions of the virtual images 711 from the position of this image feature using the method of the foregoing embodiment.

<Fifth Embodiment>

A fifth embodiment deals with the problem of low contrast for the virtual image 212. To deal with this problem, the S/N ratio is improved by utilizing the fact that virtual images obtained by diffraction possess symmetry.

By folding the correlation coefficients of the luminance values between the pair of virtual images line-symmetrically, with the position (origin) of the real image 211 as center, onto the correlation coefficients of the luminance values calculated using the method of the third embodiment, as illustrated in FIG. 6, and then executing averaging processing, it is possible to improve the S/N ratio. If we let $R_{ave}$ represent the average value of the signal, then we have the following:

$$R_{ave} = \frac{R(-x) + R(x)}{2} \qquad (6)$$

By halving only the noise signal without changing signal strength, it is possible to double the S/N ratio. Although a primary slit is used here to facilitate the description, it is possible to improve the S/N ratio by a maximum of a factor of four by using perpendicular slits.

In this embodiment, averaging processing is executed with respect to a histogram based upon correlation values. However, this does not impose any limitation. It goes without saying that it is possible to execute the processing of the embodiment after raising the signal strength of the virtual images of the original image by executing averaging processing line-symmetrically with respect to the original image.

Thus, as described above, if the luminance or correlation values of a pair of virtual images are folded line-symmetrically with the position of the real image 211 taken as the center and averaging processing is executed, an S/N-ratio-enhancing effect is obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2009-147005, filed Jun. 19, 2009, which is hereby incorporated by reference herein in its entirety.

What is claimed is:

1. An image processing apparatus comprising:
acquisition unit configured to acquire at least one diffraction image obtained by sensing the image of an object, using an image sensing unit, obtained via a diffraction grating, an imaging optical system and a RGB filter;

a real-image detection unit configured to detect a real image in the diffraction images;

a virtual image detection unit configured to detect at least one virtual image corresponding to the respective colors R, G, B in the diffraction images;

a first calculating unit configured to calculate distances between the real image and each of the virtual images;

a determination unit configured to determine whether ratios of the respective distances calculated by the first calculation unit are substantially equal to ratios of the wavelengths of the colors R, G and B; and a second calculation unit configured to calculate distance between the object and the diffraction grating using the distance calculated by the first calculating unit when the determination unit determined that the ratios of the respective distances calculated by the first calculation unit are substantially equal to the ratios of the wavelengths of the colors R, G and B.

2. The apparatus according to claim 1, wherein the first calculating unit has a first window the center of which is a center of the real image, and a second window obtained by moving the first window in a direction perpendicular to a slit in the diffraction grating; and the first calculating unit calculates a correlation between a luminance distribution in the first window and a luminance distribution in the second window, finds a center position in the second window where the correlation peaks, and decides the distance between the real image and the virtual image based upon the center position of the first window and the center position of the second window where the correlation peaks.

3. The apparatus according to claim 1, wherein the virtual image detection unit extracts the real image based luminance gradients obtained from the diffraction images.

4. The apparatus according to claim 1, further comprising an averaging unit configured to fold a pair of virtual images, which have appeared symmetrically in the diffraction images, about the center position of the real image, adding the luminance values between the pair of virtual images and taking the average of the added values.

5. An image processing method comprising:

an acquiring step of acquiring at least one diffraction image obtained by sensing the image of an object, using an image sensing unit, obtained via a diffraction grating, an imaging optical system and a RGB filter;

a real-image detection step of detecting a real image in the diffraction images;

a virtual image detection step of detecting at least one virtual image corresponding to the respective colors R, G, B in the diffraction images;

a first calculating step of calculating distances between the real image and each of the virtual images;

a determination step of determining whether ratios of the respective distances calculated in the first calculation step are substantially equal to ratios of the wavelengths of the colors R, G and B; and a second calculation step of calculating depth distance between the object and the diffraction grating using the distance calculated at said first calculating step when it is determined at the determination step that ratios of the respective distances calculated in the first calculation step are substantially equal to the ratios of the wavelengths of the colors R, G and B.

* * * * *